United States Patent
Ikeda et al.

(10) Patent No.: US 10,026,971 B2
(45) Date of Patent: Jul. 17, 2018

(54) FUEL CELL STACK

(71) Applicants: Kotaro Ikeda, Susono (JP); Yukihiro Suzuki, Kariya (JP); Eiichiro Morozumi, Kariya (JP); Takatoshi Asaoka, Kariya (JP)

(72) Inventors: Kotaro Ikeda, Susono (JP); Yukihiro Suzuki, Kariya (JP); Eiichiro Morozumi, Kariya (JP); Takatoshi Asaoka, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 15/321,911

(22) PCT Filed: Mar. 7, 2016

(86) PCT No.: PCT/JP2016/056962
§ 371 (c)(1),
(2) Date: Dec. 23, 2016

(87) PCT Pub. No.: WO2016/163189
PCT Pub. Date: Oct. 13, 2016

(65) Prior Publication Data
US 2017/0141410 A1    May 18, 2017

(30) Foreign Application Priority Data
Apr. 8, 2015  (JP) .................................. 2015-079220

(51) Int. Cl.
*H01M 8/00* (2016.01)
*H01M 8/0228* (2016.01)
(Continued)

(52) U.S. Cl.
CPC ....... *H01M 8/0228* (2013.01); *H01M 8/0254* (2013.01); *H01M 8/0265* (2013.01); *H01M 8/241* (2013.01)

(58) Field of Classification Search
CPC .. H01M 8/0228; H01M 8/241; H01M 8/0254; H01M 8/0265
See application file for complete search history.

(56) References Cited

U.S. PATENT DOCUMENTS

2004/0048134 A1    3/2004    Kihira et al.
2007/0102283 A1*   5/2007    Won .................... C23C 14/0036
                                                         204/192.12
(Continued)

FOREIGN PATENT DOCUMENTS

JP    2003331861    11/2003
JP    2004-158437    3/2004
(Continued)

OTHER PUBLICATIONS

International Search Report for International Application No. PCT/JP2016/056962, dated May 31, 2016.
(Continued)

*Primary Examiner* — Mark F. Huff
*Assistant Examiner* — Monique M Willis
(74) *Attorney, Agent, or Firm* — Patterson Thuente Pedersen, P.A.

(57) ABSTRACT

A fuel cell stack includes a plurality of cells that are stacked in a stacking direction. Each cell includes a power generating body and a pair of separators. The separators respectively are arranged on opposite surfaces of the power generating body in the stacking direction. Each separator includes a first surface and a second surface. A titanium nitride layer is formed on the first surface, and a conductive carbon layer is formed on the titanium nitride layer. A
(Continued)

titanium nitride layer is formed on the second surface. Each separator is in contact with the power generating body via the titanium nitride layer and the carbon layer on the first surface and is in contact with one of the separators of an adjacent cell via the titanium nitride layer on the second surface.

3 Claims, 1 Drawing Sheet

(51) Int. Cl.
*H01M 8/241* (2016.01)
*H01M 8/0254* (2016.01)
*H01M 8/0265* (2016.01)

(56) References Cited

U.S. PATENT DOCUMENTS

2007/0243429 A1 10/2007 Uchiyama et al.
2011/0287336 A1 11/2011 Himeno et al.
2013/0177837 A1* 7/2013 Nishiyama .......... H01M 8/0208
   429/509
2013/0330638 A1 12/2013 Dadheech et al.
2014/0227631 A1 8/2014 Jun et al.
2015/0037710 A1 2/2015 Cooke et al.

FOREIGN PATENT DOCUMENTS

| JP | 2006100246 | 4/2006 |
| JP | 2008034113 | 2/2008 |
| JP | 2010-129458 | 10/2010 |
| JP | 2014141732 | 8/2014 |
| JP | 2016030845 | 3/2016 |

OTHER PUBLICATIONS

Supplementary European Search Report for corresponding EP Application No. 16776358.0 dated Aug. 18, 2017; 8 pages.
International Preliminary Report on Patentability for corresponding PCT/JP2016/056962, dated Oct. 17, 2017, 6 pages.

* cited by examiner

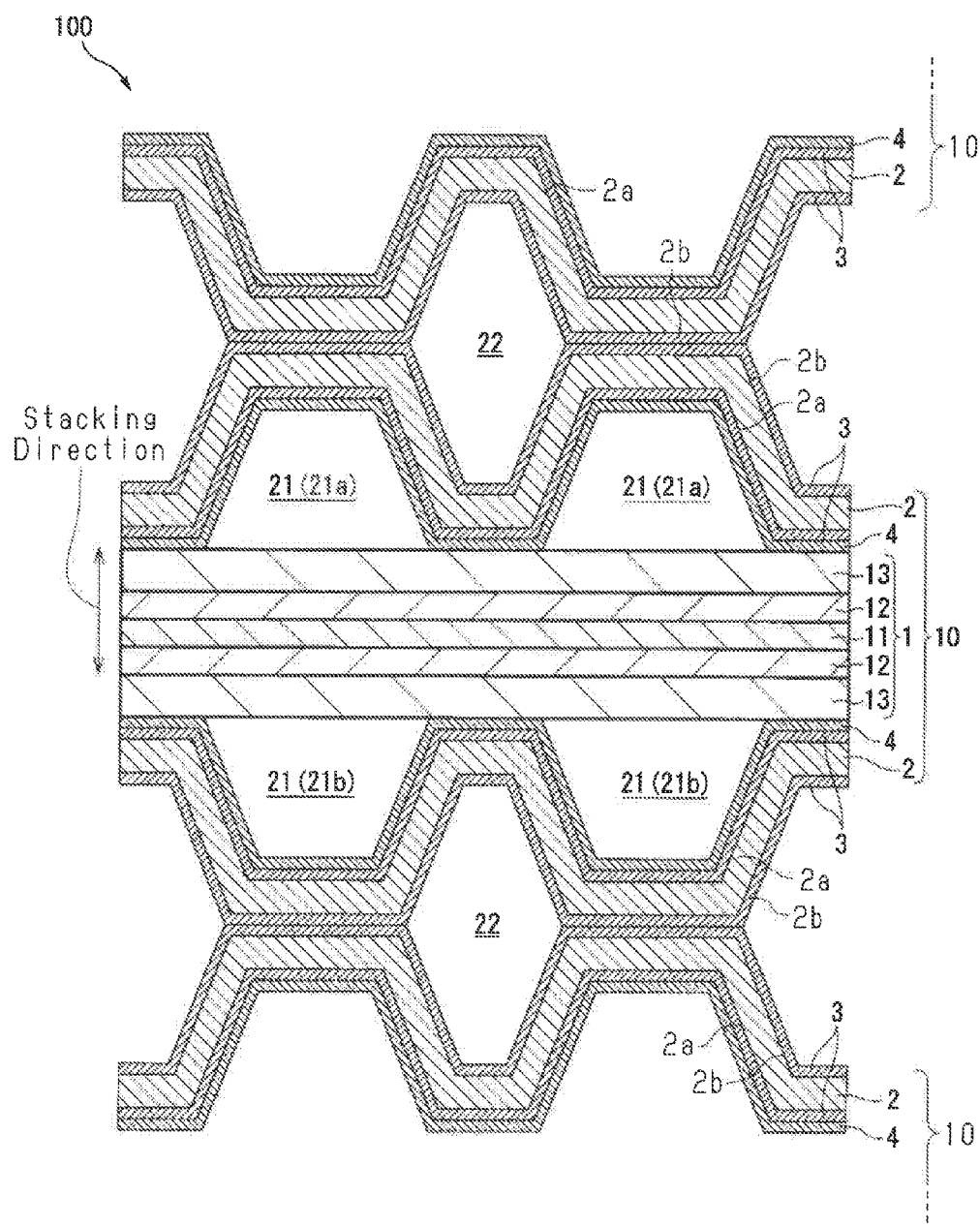

FUEL CELL STACK

RELATED APPLICATIONS

The present application in a National Phase entry of PCT Application No. PCT/JP2016/056962, filed Mar. 7, 2016, which claims priority to Japanese Patent Application No. 2015-079220, filed Apr. 8, 2015, all of said applications being hereby incorporated by reference in their entirety.

BACKGROUND OF THE INVENTION

The present invention relates to a fuel cell stack.

A fuel cell stack is configured by cells that are stacked together. As separators for the cells, separators are used that include a titanium nitride (Tin) layer formed on the surface (refer to Patent Document 1). In the separator, the titanium nitride layer restrains oxidation of the surface of the separator, thereby limiting generation of an oxide layer. This limits an increase over time in the contact resistance of the separator from the initial value.

PRIOR ART DOCUMENT

Patent Document

Patent Document 1: Japanese Laid-Open Patent Publication No. 2008-034113

SUMMARY OF THE INVENTION

According to a conventional fuel cell stack that includes the aforementioned separator, an increase over time in the contact resistance of the separator is limited. Thus, an increase over time in the internal resistance of the fuel cell stack is limited, so that a decrease in the output of the fuel cell stack is limited. Meanwhile, to further improve the output performance of the fuel cell stack, it is important to reduce the internal resistance of the fuel cell stack.

Accordingly, it is an objective of the present invention to provide a fuel cell stack that improves the output performance by applying appropriate surface treatment on the separators to reduce the internal resistance and limit an increase over time in the internal resistance.

To achieve the above objective, a fuel cell stack is configured by a plurality of cells that are stacked in a stacking direction. Each cell includes a power generating body and a pair of separators. The separators respectively are arranged on opposite surfaces of the power generating body in the stacking direction. Each separator includes a first surface and a second surface, which is opposite to the first surface in the stacking direction. A titanium nitride layer is formed on the first surface, and a conductive carbon layer is formed on the titanium nitride layer. A titanium nitride layer is formed on the second surface. Each separator is in contact with the power generating body via the titanium nitride layer and the carbon layer on the first surface and is in contact with one of the separators of an adjacent cell in the stacking direction via the titanium nitride layer on the second surface.

According to the fuel cell stack, the internal resistance of the fuel cell stack is reduced, and an increase over time in the internal resistance is limited. Thus, the output performance of the fuel cell stack is improved.

BRIEF DESCRIPTION OF THE DRAWING

FIG. 1 is a cross-sectional view of a primary part of a fuel cell stack according to one embodiment of the present invention.

DETAILED DESCRIPTION OF THE PREFERRED EMBODIMENTS

A fuel cell stack 100 according to one embodiment of the present invention will now be described in detail with reference to the drawing. In the following description, the same reference numerals are given to the similar components.

FIG. 1 is a cross-sectional view of a primary part of a fuel cell stack according to the embodiment of the present invention.

The fuel cell stack 100 includes cells 10 that are stacked together in the stacking direction. The cells 10 are electrically connected in series.

Each cell 10 is a polymer electrolyte fuel cell that generates electromotive force by electrochemical reaction between oxidant gas (e.g., air) and fuel gas (e.g., hydrogen). Each cell 10 includes a power generating body 1 and two separators 2, which are respectively arranged on the opposite surfaces of the power generating body 1 in the stacking direction.

The power generating body 1 is, for example, a membrane electrode and gas diffusion layer assembly (MEGA) or a membrane electrode assembly (MEA). The present embodiment employs an MEGA as the power generating body 1.

As shown in FIG. 1, the power generating body 1 includes a proton conductive ion exchange membrane formed of a solid polymeric material (hereinafter, referred to as an electrolyte film 11), catalytic layers 12 that are respectively formed on the opposite surfaces of the electrolyte film 11 in the stacking direction, and gas diffusion layers 13 each of which is formed on the surface of each catalytic layer 12. In each power generating body 1, the electrolyte film 11, the catalytic layers 12, and the gas diffusion layers 13 are integrated with each other. Each catalytic layer 12 is formed of, e.g., a porous carbon material, which supports catalyst such as platinum. Each gas diffusion layer 13 is formed of a gas permeable conductive member such as carbon porous body, such as carbon paper and carbon cloth, and metal porous body, such as metal mesh and porosity metal.

In contrast, when an MEA is employed as the power generating body 1, the power generating body 1 includes an electrolyte film 11, and two catalytic layers 12, which are integrally formed respectively on the opposite surfaces of the electrolyte film 11 in the stacking direction.

Each separator 2 is a plate-like member having metal that is excellent in conductivity and gas impermeability as a base material. Each separator 2 has a first surface 2a and a second surface 2b, which is opposite to the first surface 2a in the stacking direction. The first surface 2a of each separator 2 faces the corresponding power generating body 1, and the second surface 2b faces the second surface 2b of another separator 2 adjacent to the referenced separator 2. In the present embodiment, titanium is employed as a base material of the separator 2.

The separator 2 is formed to have a corrugated cross section obtained by causing portions of the separator 2 to partially project, for example, by stamping the separator 2 so that spaces that constitute gas passages 21 are formed between the surface of the power generating body 1 and the first surface 2a of the separator 2 and so that spaces that constitute coolant passages 22 are formed between the second surface 2b of the separator 2 and the second surface 2b of another separator 2 adjacent to the referenced separator 2. Thus, as shown in FIG. 1, each cell 10 includes gas passages 21 formed on the opposite sides of the power generating body 1 in the stacking direction. Then, coolant passages 22 are formed between the adjacent cells 10. In each cell 10, among gas passages 21 that are opposite to each other with the power generating body 1 in between, the gas passages 21 on one side in the stacking direction constitute gas passages 21a to which oxide gas is supplied. The gas passages 21 on the other side constitute gas passages 21b to which fuel gas is supplied. When oxide gas is supplied to the gas passages 21a and fuel gas is supplied to the gas passages 21b, electrochemical reaction occurs in the power generating body 1 to generate electromotive force.

Titanium nitride layers 3 are respectively formed on the first surface 2a and the second surface 2b of the separator 2. A method for forming titanium nitride layers 3 on the surfaces of the separator 2 may be, e.g., a method for forming the titanium nitride layers 3 by nitriding the surfaces of the separator 2 that includes titanium as a base material, in an atmosphere containing nitrogen or a method for forming the titanium nitride layers 3 by a dry coat method while applying bias voltage less than 100 [v] to the surfaces of the separator 2 that includes titanium as a base material. However, a method for forming a titanium layer 3 is not limited to these methods.

In the present embodiment, the titanium nitride layers 3 are formed on the surfaces of the separator 2 by nitriding the surfaces of the separator 2, which includes titanium as a base material, in an atmosphere containing nitrogen. The process time of nitriding is, e.g., about from a few seconds to three hours, and the process temperature is, e.g., about from 300° C. to 1300° C. Through the nitriding process, the titanium nitride layers 3 having thicknesses approximately from 10 [nm] to 200 [μm] are formed on the respective surfaces of the separator 2. In FIG. 1, the thicknesses of the titanium nitride layers 3, the plate thicknesses of the separators 2, and the plate thickness of the power generating body 1 are not accurate. For easy understanding of the invention, they are individually modified.

Forming titanium nitride layers 3 on the surfaces of the separator 2 restrains oxidation of the surfaces of the separator 2, thereby limiting generation of an oxide film. Thus, an increase over time in the contact resistance of the separator 2 is limited. As a result, an increase over time in the internal resistance of the fuel cell stack 100 is limited, and a decrease in the output of the fuel cell stack 100 is limited.

In the present embodiment, of the titanium nitride layers 3 formed on the first surface 2a and the second surface 2b of the separator 2, a conductive carbon layer 4 having a thickness similar to those of the titanium nitride layers 3 is formed only on the surface of the titanium nitride layer 3 formed on the first surface 2a that faces the power generating body 1. A method for forming a conductive carbon layer 4 on the surface of the titanium nitride layer 3 may be, e.g., a method for forming the carbon layer 4 by coating the titanium nitride layer 3 by spraying the mixture obtained by mixing carbon, plastic, and solvent on the surface of the titanium nitride layer 3 or a method for forming the carbon layer 4 by transfer. However, the method for forming a conductive carbon layer 4 is not limited to these methods.

Thus, each separator 2 contacts the power generating body 1 via the titanium nitride layer 3 and the carbon layer 4 on the first surface 2a, and contacts one of the separators 2 of the adjacent cell 10 via the titanium nitride layer 3 on the second surface 2b. The reason for forming the conductive carbon layer 4 only on the surface of the titanium nitride layer 3 on the first surface 2a that faces the power generating body 1 is obtained by the following knowledge.

The methods for improving the output of the fuel cell stack 100 include the one in which the internal resistance of the fuel cell stack 100 is decreased by decreasing the contact resistance of the separators 2. Thus, the inventors of the present case attempted to reduce contact resistance of the separators 2 by forming the conductive carbon layers 4 on the surfaces of the titanium nitride layers 3. As a result, it was discovered that the contact resistance on the boundary surfaces between the separators 2 and the corresponding power generating body 1 was reduced, and the contact resistance on the boundary surfaces between the separators 2 and the adjacent separators 2 was increased.

A comparative test of contact resistance on the boundary surface between a separator 2 and the corresponding power generating body 1 was performed by measuring a voltage applied between a carbon paper and the separator 2 when current of 1 [A] flowed in a state in which a predetermined compression load of 1 [MPa] was applied, in the stacking direction, to the carbon paper placed on the separator 2 as a gas diffusion layer 13. Table 1 shows the result of the test. Table 1 shows that the contact resistance on the boundary surface between the separator 2 and the power generating body 1 was reduced in the present embodiment in which a conductive carbon layer 4 was formed on the surface of the titanium nitride layer 3 on the first surface 2a of the separator 2, which faced the power generating body 1, in comparison to a comparative example in which only the titanium nitride layer was formed on the first surface 2a.

TABLE 1

| | Contact resistance |
|---|---|
| (The present embodiment) When a titanium nitride layer and a conductive carbon layer were formed on the first surface of a separator | 4 to 5 [mΩ · cm$^2$] |
| (Comparative example) When only a titanium nitride layer was formed on the first surface of a separator | 9 to 10 [mΩ · cm$^2$] |

A comparative test of contact resistance on the boundary surface between the adjacent separators 2 was performed by measuring a voltage applied between the adjacent separators 2 when current of 1 [A] flowed in a state in which a predetermined compression load of 1 [MPa] was applied to two separators 2 stacked together in the stacking direction. Table 2 shows the result. Table 2 shows that contact resistance on the boundary surface between the adjacent separators 2 was increased on the second surface 2b of the separator 2 that faced the adjacent separator 2 in the comparative example in which a conductive carbon layer 4 was formed on the surface of the titanium nitride layer 3 in comparison with the present embodiment.

TABLE 2

| | Contact resistance |
|---|---|
| (Comparative example) When a titanium nitride layer and a conductive carbon layer were formed on the second surface of a separator | 5 to 6 [mΩ · cm$^2$] |
| (The present embodiment) | 1 to 2 [mΩ · cm$^2$] |

TABLE 2-continued

| | Contact resistance |
|---|---|
| When only a titanium nitride layer was formed on the second surface of a separator | 5 |

Therefore, as the present embodiment, in the separators 2, forming the conductive carbon layers 4 only on the surfaces of the titanium nitride layers 3 on the first surfaces 2a that face the power generating bodies 1 results in reducing the internal resistance of the fuel cell stack 100 in which cells 10 are stacked together. This allows the output of the fuel cell stack 100 to improve.

Forming a conductive carbon layer 4 on the surface of the titanium nitride layer 3 on the second surface 2b of the separator 2 that faces the adjacent separator 2 increases the contact resistance on the boundary surface between the separators 2. The reason for this phenomenon is presumed to be as follows.

That is, the material of the conductive carbon layer 4 is a mixture of carbon, which is a conductive member, and plastic, which is non-conductive member. Thus, the surface of the carbon layer 4 includes portions through which no current flows. Thus, in a case in which a conductive carbon layer 4 is formed on the surface of the titanium nitride layer 3 on the second surface 2b of the separator 2, when the separators 2 are in contact with each other, the carbon layers 4 of the separators 2 are in contact with each other. This increases the area of portions through which no current flows between the adjacent separators 2. It is presumed that this increased the contact resistance.

According to the above-illustrated embodiment, the fuel cell stack 100 includes cells 10 that are stacked together in the stacking direction. Each cell 10 includes a power generating body 1 and a pair of separators 2, which is arranged on the opposite surfaces of the power generating body 1 in the stacking direction. Each separator 2 includes a first surface 2a and a second surface 2b, which is opposite to the first surface 2a in the stacking direction. Each separator 2 includes a titanium nitride layer 3 formed on the first surface 2a and a conductive carbon layer 4 formed on the titanium nitride layer 3. Each separator 2 includes a titanium nitride layer 3 formed on the second surface 2b. Each separator 2 contacts the power generating body 1 via the titanium nitride layer 3 and the carbon layer 4 on the first surface 2a and contacts one of the separators 2 of the adjacent cell 10 in the stacking direction via the titanium nitride layer 3 on the second surface 2b.

This reduces the internal resistance of the fuel cell stack 100 and limits an increase over time in the internal resistance. Therefore, the output of the fuel cell stack 100 is improved, and the decrease of the output over time is limited, so that the output performance of the fuel cell stack 100 is improved.

In other words, according to the present embodiment, the titanium nitride layer 3 is formed on the first surface 2a of the separator 2 that faces the power generating body 1. Thus, formation of an oxide film on the first surface 2a is limited. Therefore, an increase over time in the contact resistance on a boundary surface between the separator 2 and the power generating body 1 is limited. Furthermore, the separator 2 contacts the power generating body 1 via the conductive carbon layer 4 formed on the titanium nitride layer 3 on the first surface 2a. Thus, the contact resistance on the boundary surface between the separator 2 and the power generating body 1 is reduced.

If a conductive carbon layer 4 were formed on the second surface 2b of the separator 2 that faces the adjacent separator 2 in a similar way to the first surface 2a, the adjacent separators 2 would contact each other via carbon layers 4 on the individual second surfaces 2b. This would increase the contact resistance on the boundary surface between the adjacent separators 2. Thus, according to the present embodiment, only the titanium nitride layer 3 is formed on the second surface 2b of the separator 2. Thus, the adjacent separators 2 contact each other via the titanium nitride layers 3 formed on the individual second surfaces 2b. Thus, an increase in the contact resistance on the boundary surface between the adjacent separators 2 is prevented, and an increase over time in the contact resistance is limited.

Preferably, the thickness of the titanium nitride layer formed on the surface of the separator is about from 10 [nm] to 200 [μm]. Thus, a separator including the titanium nitride layer formed on the surface is easily manufactured.

In addition, preferably, the thickness of the carbon layer formed on the titanium nitride layer is about the same as the thickness of the titanium nitride layer. Thus, a separator including a titanium nitride layer and a carbon layer formed on the surface is easily manufactured.

As above, the embodiment of the present invention has been described. However, the embodiment merely indicates a part of application of the present invention, there is no intention to limit the technical scope of the present invention to the particular configuration of the embodiment.

For example, in the above embodiment, a conductive carbon layer 4 is formed on the entire surface of the titanium nitride layer 3 formed on the first surface 2a of the separator 2. The carbon layer 4 may be formed on a portion where the contact resistance occurs on the titanium nitride layer 3 by at least contacting the power generating body 1.

DESCRIPTION OF THE REFERENCE NUMERALS

1 . . . power generating body, 2 . . . separator, 2a . . . first surface, 2b . . . second surface, 3 . . . titanium nitride layer, 4 . . . carbon layer, 10 . . . cell, 100 . . . fuel cell stack.

The invention claimed is:

1. A fuel cell stack configured by a plurality of cells that are stacked in a stacking direction, each cell including a power generating body and a pair of separators, wherein:
   the separators respectively are arranged on opposite surfaces of the power generating body in the stacking direction,
   each separator includes a first surface and a second surface, which is opposite to the first surface in the stacking direction,
   a titanium nitride layer is formed on the first surface, and a conductive carbon layer is formed on the titanium nitride layer,
   a titanium nitride layer is formed on the second surface, and
   each separator is in contact with the power generating body via the titanium nitride layer and the carbon layer on the first surface and is in contact with one of the separators of an adjacent cell in the stacking direction via the titanium nitride layer on the second surface.

2. The fuel cell stack according to claim 1, wherein a thickness of the titanium nitride layer is from 10 to 200.

3. The fuel cell stack according to claim 2, wherein a thickness of the carbon layer is about the same as the thickness of the titanium nitride layer.

* * * * *